US009447895B2

(12) United States Patent
Tice et al.

(10) Patent No.: US 9,447,895 B2
(45) Date of Patent: Sep. 20, 2016

(54) MICROFLUIDIC PRESSURE AMPLIFIER CIRCUITS AND ELECTROSTATIC GATES FOR PNEUMATIC MICROSYSTEMS

(71) Applicant: The Board of Trustees of the University of Illinois, Urbana, IL (US)

(72) Inventors: Joshua D. Tice, Urbana, IL (US); Thomas A. Bassett, Bourbannais, IL (US); Amit V. Desai, Urbana, IL (US); Christopher A. Apblett, Albuquerque, NM (US); Paul J. A. Kenis, Champaign, IL (US)

(73) Assignees: The Board of Trustees of the University Of Illinois, Urbana, IL (US); Sandia Corporation, Albuquerque, NM (US)

( * ) Notice: Subject to any disclaimer, the term of this patent is extended or adjusted under 35 U.S.C. 154(b) by 348 days.

(21) Appl. No.: 13/901,200

(22) Filed: May 23, 2013

(65) Prior Publication Data

US 2013/0313452 A1 Nov. 28, 2013

Related U.S. Application Data

(60) Provisional application No. 61/651,887, filed on May 25, 2012.

(51) Int. Cl.
  *F16K 99/00* (2006.01)
  *F16K 31/02* (2006.01)

(52) U.S. Cl.
  CPC ............ *F16K 31/02* (2013.01); *F16K 99/0026* (2013.01); *F16K 99/0051* (2013.01); *F16K 2099/0084* (2013.01)

(58) Field of Classification Search
  CPC ........... F16K 99/0015; F16K 99/0026; F16K 99/0051; F16K 99/0059; F16K 2099/0084; F16K 31/0693
  USPC ................................... 251/281, 282, 129.07
  See application file for complete search history.

(56) References Cited

U.S. PATENT DOCUMENTS

| 7,232,109 B2 | 6/2007 | Driggs et al. |
| 7,291,512 B2 | 11/2007 | Unger |

(Continued)

OTHER PUBLICATIONS

Anderson, M.J., "Microfluidics-Based Strategies for Protein Crystallography" Dissertation (Ph.D.), *California Institute of Technology*, (2009) pp. iii-206.

(Continued)

*Primary Examiner* — Matthew W Jellett
(74) *Attorney, Agent, or Firm* — Brinks Gilson & Lione

(57) ABSTRACT

An electrostatic actuator is provide that can include a fluidic line, a first electrode, and a second electrode such that a gate chamber portion of the fluidic line is sandwiched between the first electrode and the second electrode. The electrostatic actuator can also include a pressure-balancing channel in fluid communication with the gate chamber portion where the first electrode is sandwiched between the pressure-balancing channel and the gate chamber portion. A pneumatic valve system is provided which includes an electrostatic gate and a fluidic channel fluidly separate from a fluidic control line. A pneumatic valve portion of the fluidic control line can be positioned relative to a portion of the fluidic channel such that expansion of the pneumatic valve portion restricts fluid flow through the fluidic channel. Methods of using an electrostatic actuator and a pneumatic valve system are also provided.

13 Claims, 11 Drawing Sheets

(56) References Cited

U.S. PATENT DOCUMENTS

| | | | |
|---|---|---|---|
| 8,539,981 B2* | 9/2013 | Chappel | 137/625.28 |
| 2008/0149869 A1* | 6/2008 | Shannon et al. | 251/129.01 |
| 2010/0101670 A1 | 4/2010 | Juncker et al. | |
| 2012/0325665 A1* | 12/2012 | Chiou et al. | 204/601 |

OTHER PUBLICATIONS

Goulbourne, N. et al., "Modeling of a Dielectric Elastomer Diaphragm for a Prosthetic Blood Pump," *Proceedings of SPIE*, 5051 (2003) pp. 319-331.
Maghribi, M. et al., "Stretchable Micro-Electrode Array," *Proc. Intl. IEEE-EMBS Conference Microtechnologies in Medicine and Biology*, (2002) pp. 80-83.
Mohan, R. et al., "Design Considerations for Elastomeric Normally Closed Microfluidic Valves," *Sensors and Actuators B*, 160 (2011) pp. 1216-1223.
Senturia, S.D., Microsystem Design, Kluwer *Academic Publishers*, (2001) pp. 334-339.
Tice, J.D. et al., "Electrostatic Microvalves for Integrated Microchemical Systems," *Proceedings of the 15th International Conference on Miniaturized Systems for Chemistry and Life Sciences*, (2011) pp. 1813-1815.
Yoshida, K. et al., "Normally-Closed Electrostatic Micro Valve with Pressure Balance Mechanism for Portable Fuel Cell Application," *Proceedings of Micro Electro Mechanical Systems (MEMS)* (2006), pp. 722-725.
Addae-Mensah, Kweku A. et al., "Actuation of elastomeric microvalves in point-of-care settings using handheld, battery-powered instrumentation," *Lab Chip*, 10 (2010) pp. 1618-1622.
Anjewierden, Douglas et al., "An electrostatic microvalve for pneumatic control of microfluidic systems," *Journal of Micromechanics and Microengineering*, 22 (2012) 025019, pp. 1-9.
Armani, Deniz et al., "Re-Configurable Fluid Circuits by PDMS Elastomer Micromachining," *Twelfth IEEE International Conference on Micro Electro Mechanical Systems*, MEMS '99 (1999), pp. 222-227.
Bae, Byunghoon et al., "A Bidirectional Electrostatic Microvalve With Microsecond Switching Performance," *Journal of Microelectromechanical Systems*, 16, 6, (2007) pp. 1461-1471.
Bansal, Tushar et al., "A class of low voltage, elastomer-metal 'wet' actuators for use in high-density microfluidics," *Lab Chip*, 7 (2007) pp. 164-166.
Begley, Matthew R. et al., "The electro-mechanical response of elastomer membranes coated with ultra-thin metal electrodes," *Journal of the Mechanics and Physics of Solids*, 53 (2005) pp. 2557-2578.
Blazej, Robert G. et al., "Microfabricated bioprocessor for integrated nanoliter-scale Sanger DNA sequencing," *Proceedings of the National Academy of Sciences*, 103, 19 (2006) pp. 7240-7245.
Cabuz, C. et al., "Factors enhancing the reliability of touch-mode electrostatic actuators," *Sensors and Actuators*, 79 (2000) pp. 245-250.
Chang, Meng-Ping et al., "Electrostatically-driven elastomer components for user-reconfigurable high density microfluidics," *Lab Chip*, 9 (2009) pp. 1274-1281.
Chatterjee, Debalina et al., "Droplet-based microfluidics with nonaqueous solvents and solutions," *Lab Chip*, 6 (2006) pp. 199-206.
Cole, Matthew C. et al., "Two-layer multiplexed peristaltic pumps for high-density integrated microfluidics," *Sensors and Actuators B: Chemical*, 151 (2011) pp. 384-393.
Coleman, Jonathan N. et al., "Small but strong: A review of the mechanical properties of carbon nanotube—polymer composites," *Carbon*, 44 (2006) pp. 1624-1652.
Darling, Robert B. et al., "Compact analytical modeling of squeeze film damping with arbitrary venting conditions using a Green's function approach," *Sensors and Actuators A*, 70 (1998) pp. 32-41.

De Boer, M. P. et al., "Accurate method for determining adhesion of cantilever beams," *Journal of Applied Physics*, 86, 2 (1999) pp. 817-827.
De Voider, Michael et al., "Pneumatic and hydraulic microactuators: a review," *Journal of Micromechanics and Microengineering*, 20 (2010) 043001, pp. 1-18.
Desai, Amit V. et al., "Design considerations for electrostatic microvalves with applications in poly(dimethylsiloxane)-based microfluidics," *Lab Chip*, 12 (2012) pp. 1078-1088.
Flores, G. et al., "Analysis of the Dynamics and Touchdown in a Model of Electrostatic MEMS," *SIAM Journal on Applied Mathematics*, 67, 2 (2007) pp. 434-446.
Futai, Nabuyuki et al., "Handheld recirculation system and customized media for microfluidic cell culture," *Lab Chip*, 6 (2006) pp. 149-154.
Gardea-Torresdey, J. L. et al., "Gold nanoparticles obtained by bio-precipitation from gold (III) solutions," *Journal of Nanoparticle Research*, 1 (1999) pp. 397-404.
Grover, William H. et al., "Development and multiplexed control of latching pneumatic valves using microfluidic logical structures," *Lab Chip*, 6 (2006) pp. 623-631.
Gu, Wei et al., "Computerized microfluidic cell culture using elastomeric channels and Braille displays," *Proceedings of National Academy Sciences*, 101, 45 (2004) pp. 15861-15866.
Gu, Wei et al., "Multiplexed hydraulic valve actuation using ionic liquid filled soft channels and Braille displays," *Applied Physics Letters*, 90 (2007) pp. 033505-1-033505-3.
Guo, Yujin et al., "Touchdown and Pull-In Voltage Behavior of a MEMS Device with Varying Dielectric Properties," *SIAM Journal on Applied Mathematics*, 66, 1 (2005) pp. 309-338.
Hsia, K. J. et al., "Collapse of stamps for soft lithography due to interfacial adhesion," *Applied Physics Letters*, 86 (2005) 154106, pp. 1-3.
Hu, Huan et al., "Characterizations and Optimization of Electrical Contact Between Nanocomposite Elastomer and Metal," *Transducers 2009*, Denver, Colorado (Jun. 21-25, 2009) pp. 1103-1105.
Huebner, Ansgar et al., "Microdroplets: A sea of applications'?," *Lab Chip*, 8 (2008) pp. 1244-1254.
Jacobson, Stephen C. et al., "Effects of Injection Schemes and Column Geometry on the Performance of Microchip Electrophoresis Devices," *Analytical Chemistry*, 66, 7 (1994) pp. 1107-1113.
Jensen, Klavs F., "Microreaction engineering—is small better'?," *Chemical Engineering Science*, 56 (2001) pp. 293-303.
Langelier, Sean M. et al., "Acoustically driven programmable liquid motion using resonance cavities," *Proceedings of the National Academy of Sciences*, 106, 31 (2009) pp. 12617-12622.
Lee, Chung-Cheng et al., "Multistep Synthesis of a Radiolabeled Imaging Probe Using Integrated Microfluidics," *Science*, 310 (2005) pp. 1793-1796.
Lee, Dong Woo et al., "High-radix microfluidic multiplexer with pressure valves of different thresholds," *Lab Chip*, 9 (2009) pp. 1681-1686.
Leslie, Daniel C. et al., "Frequency-specific flow control in microfluidic circuits with passive elastomeric features," *Nature Physics*, 5 (2009) pp. 231-235.
Liu, Miao et al., "Characterization study of bonded and unbonded polydimethylsiloxane aimed for bio-micro-electromechanical systems-related applications," *Journal of Micro/Nanolithography, MEMS and MOEMS*, 6, 2 (2007) pp. 023008-1-023008-6.
Liu, Miao et al., "Thickness-dependent mechanical properties of polydimethylsiloxane membranes," *Journal of Micromechanics and Microengineering*, 19 (2009) 035028, pp. 1-4.
Maboudian, Roya et al., "Critical Review: Adhesion in surface micromechanical structures," *Journal of Vacuum Science & Technology B*, 15, 1 (1997) pp. 1-20.
Maerkl, Sebastian J. et al., "A Systems Approach to Measuring the Binding Energy Landscapes of Transcription Factors," *Science*, 315 (2007) pp. 233-237.
Marcy, Yann et al., "Dissecting biological "dark matter" with single-cell genetic analysis of rare and uncultivated TM7 microbes from the human mouth," *Proceedings of the National Academy of Sciences*, 104, 29 (2007) pp. 11889-11894.

(56) References Cited

OTHER PUBLICATIONS

Mastrangelo, C. H. et al., "Mechanical Stability and Adhesion of Microstructures Under Capillary Forces—Part I: Basic Theory," *Journal of Microelectromechanical Systems*, 2, 1 (1993) pp. 33-43.
Mastrangelo, C. H. et al., "Mechanical Stability and Adhesion of Microstructures Under Capillary Forces—Part II: Experiments," *Journal of Microelectromechanical Systems*, 2, 1 (1993) pp. 44-55.
Meitl, Matthew A. et al., "Solution Casting and Transfer Printing Single-Walled Carbon Nanotube Films," *Nano Letters*, 4, 9 (2004) pp. 1643-1647.
Mosadegh, Bobak et al., "Integrated elastomeric components for autonomous regulation of sequential and oscillatory flow switching in microfluidic devices," *Nature Physics*, 6 (2010) pp. 433-437.
Mosadegh, Bobak et al., "Next-generation integrated microfluidic circuits," *Lab Chip*, 11 (2011) pp. 2813-2818.
Oh, Kwang W. et al., "A review of microvalves," *Journal of Micromechanics and Microengineering*, 16 (2006) pp. R13-R39.
Osterberg, Peter M. et al., "M-TEST: A Test Chip for MEMS Material Property Measurement Using Electrostatically Actuated Test Structures," *Journal of Microelectromechanical Systems*, 6, 2 (1997) pp. 107-118.
Pal, R. et al., "An integrated microfluidic device for influenza and other genetic analyses," *Lab Chip*, 5 (2005) pp. 1024-1032.
Parker, Elizabeth E. et al., "Adhesion Characteristics of MEMS in Microfluidic Environments," *Journal of Microelectromechanical Systems*, 14, 5 (2005) pp. 947-953.
Pekas, Nikola et al., "Wet-etching of structures with straight facets and adjustable taper into glass substrates," *Lab Chip*, 10 (2010) pp. 494-498.
Perry, Sarah L. et al., "Microfluidic Generation of Lipidic Mesophases for Membrane Protein Crystallization," *Crystal Growth & Design*, 9, 6 (2009) pp. 2566-2569.
Prakash, Shaurya et al., "Surface modification in microsystems and nanosystems," *Surface Science Reports*, 64 (2009) pp. 233-254.
Rhee, Minsoung et al., "Microfluidic pneumatic logic circuits and digital pneumatic microprocessors for integrated microfluidic systems," *Lab Chip*, 9 (2009) pp. 3131-3143.
Rohde, Christopher B. et al., "Microfluidic system for on-chip high-throughput whole-animal sorting and screening at subcellular resolution," *Proceedings of the National Academy of Sciences*, 104, 35 (2007) pp. 13891-13895.
Rollier, A.-S. et al., "The stability and pull-in voltage of electrostatic parallel-plate actuators in liquid solutions," *Journal of Micromechanics and Microengineering*, 16 (2006) pp. 794-801.
Sandler, J. K. W. et al., "Ultra-low electrical percolation threshold in carbon-nanotube-epoxy composites," *Polymer*, 44 (2003) pp. 5893-5899.
Schneider, F. et al., "Mechanical properties of silicones for MEMS," *Journal of Micromechanics and Microengineering*, 18 (2008) 065008, pp. 1-9.
Schudel, Benjamin R. et al., "Microfluidic chip for combinatorial mixing and screening of assays," *Lab Chip*, 9 (2009) pp. 1676-1680.
Schudel, Benjamin R. et al., "Multiplexed detection of nucleic acids in a combinatorial screening chip," *Lab Chip*, 11 (2011) pp. 1916-1923.
Sharp, Kenneth G. et al., "Effect of Stamp Deformation on the Quality of Microcontact Printing: Theory and Experiment," *Langmuir*, 20, 15 (2004) pp. 6430-6438.
Small, Martha K. et al., "Analysis of the accuracy of the bulge test in determining the mechanical properties of thin films," *Journal of Materials Research*, 7, 6 (1992) pp. 1553-1563.
Sounart, Thomas L. et al., "Frequency-Dependent Electrostatic Actuation in Microfluidic MEMS," *Journal of Microelectromechanical Systems*, 14, 1 (2005) pp. 125-133.
Spurgeon, Sandra L. et al., "High Throughput Gene Expression Measurement with Real Time PCR in a Microfluidic Dynamic Array," *PLoS ONE*, 3, 2 (2008) e1662, pp. 1-7.
Stroock, Abraham D. et al., "Chaotic Mixer for Microchannels," *Science*, 295 (2002) pp. 647-651.
Studer, Vincent et al., "Scaling properties of a low-actuation pressure microfluidic valve," *Journal of Applied Physics*, 95, 1 (2004) pp. 393-398.
Thangawng, Abel L. et al., "An ultra-thin PDMS membrane as a bio/micro-nano interface: fabrication and characterization," *Biomedical Microdevices*, 9 (2007) pp. 587-595.
Thorsen, Todd et al., "Microfluidic Large-Scale Integration," *Science*, 298 (2002) pp. 580-584.
Thorson, Michael R. et al., "A microfluidic platform for pharmaceutical salt screening," *Lab Chip*, 11 (2011) pp. 3829-3837.
Unger, Marc A. et al., "Monolithic Microfabricated Valves and Pumps by Multilayer Soft Lithography," *Science*, 288 (2000) pp. 113-116.
Urbanski, John Paul et al., "Digital microfluidics using soft lithography," *Lab Chip*, 6 (2006) pp. 96-104.
van der Wijngaart, Wouter et al., "A high-stroke, high-pressure electrostatic actuator for valve applications," *Sensors and Actuators A*, 100 (2002) pp. 264-271.
Vlassak, J. J. et al., "A new bulge test technique for the determination of Young's modulus and Poisson's ratio of thin films," *Journal of Materials Research*, 7, 12 (1992) pp. 3242-3249.
Wang, C. et al., "Deflection and stability of membrane structures under electrostatic and Casimir forces in microelectromechanical systems," *Acta Mechanica*, 180 (2005) pp. 49-60.
Weaver, James A. et al., "Static control logic for microfluidic devices using pressure-gain valves," *Nature Physics*, 6 (2010) pp. 218-223.
Wibbeler, Jürgen et al., "Parasitic charging of dielectric surfaces in capacitive microelectromechanical systems (MEMS)," *Sensors and Actuators A*, 71 (1998) pp. 74-80.
Wu, Zhuangchun et al., "Transparent, Conductive Carbon Nanotube Films," *Science*, 305 (2004) pp. 1273-1276.
Xie, Jun et al., "Surface micromachined electrostatically actuated micro peristaltic pump," *Lab Chip*, 4 (2004) pp. 495-501.
Yang, Li et al., "Effect of Surface Free Energy on PDMS Transfer in Microcontact Printing and Its Application to ToF-SIMS to Probe Surface Energies," *Langmuir*, 25, 10 (2009) pp. 5674-5683.
Yao, Tze-Jung et al., "Dielectric Charging Effects on Parylene Electrostatic Actuators," *The Fifteenth IEEE International Conference on Micro Electro Mechanical Systems* (2002) pp. 614-617.
Yapu, Zhao, "Stiction and Anti-Stiction in MEMS and NEMS," *Acta Mechanica Sinica (English Series)*, 19, 1 (2003) pp. 1-10.
Yildirim, E. et al., "Analysis and characterization of an electrostatically actuated in-plane parylene microvalve," *Journal of Micromechanics and Microengineering*, 21 (2011) 105009, pp. 1-9.
Yu, Ying-Song et al., "Deformation of PDMS membrane and microcantilever by a water droplet: Comparison between Mooney-Rivlin and linear elastic constitutive models," *Journal of Colloid and Interface Science*, 332 (2009) pp. 467-476.
Zhang, Qing et al., "Design and fabrication of novel compliant electrostatically actuated microvalves," *Advanced Materials Research*, 74 (2009) pp. 179-182.
Zhou, Yangxin et al., "A method of printing carbon nanotube thin films," *Applied Physics Letters*, 88 (2006) pp. 123109-1-123109-3.

\* cited by examiner

US 9,447,895 B2

MICROFLUIDIC PRESSURE AMPLIFIER CIRCUITS AND ELECTROSTATIC GATES FOR PNEUMATIC MICROSYSTEMS

RELATED APPLICATIONS

This application claims priority under 35 U.S.C. §119(e) to U.S. Provisional Application No. 61/651,887, "MICROFLUIDIC PRESSURE AMPLIFIER CIRCUITS AND ELECTROSTATIC GATES FOR PNEUMATIC MICROSYSTEMS," filed May 25, 2012, the entire contents of which are incorporated by reference.

FEDERALLY FUNDED RESEARCH OR DEVELOPMENT

This invention was made with government support under contract number DMI-0328162 awarded by the National Science Foundation. The U.S. Government has certain rights in this invention.

TECHNICAL FIELD

The present disclosure is related generally to fluidic circuits and more particularly to microfluidic control systems.

BACKGROUND

Pneumatic microvalves have been widely implemented in chemical and biological microsystems (e.g., in platforms for protein crystallization screening, genomic analysis, and biological network characterization) due to their unique combination of simplicity, reliability, and versatility. The microvalves possess a small footprint and are fabricated with soft-lithographic techniques, making them easily integrated into elastomers-based chips. They can operate over wide ranges of viscosity, temperature, and pH, and they can be engineered to seal hermetically, even when subjected to high pressures.

However, despite all these advantages and more, pneumatic microvalves have yet to see extensive use in portable applications because the equipment needed to operate the microvalves, typically a pressure source, an array of solenoid valves, and electronic controls, are prohibitively bulky. Additionally, the external valves that translate electrical signals into actuation events are problematic because they require significant power to operate.

BRIEF SUMMARY

Described herein are pneumatic valve systems and electrostatic actuators. Pneumatic valve systems and electrostatic actuators may be fabricated with soft-lithographic techniques, allowing them to be integrated directly on-chip in a scalable manner. The gates may actuate with potentials less than 300 V, and when incorporated into fluidic amplifier circuits, they allow pneumatic control channels to be pressurized up to about 200 kPa. Used in conjunction with a compact source of pressure and electronic ancillaries, such systems offers a means of transmitting instructions to pneumatic actuators in portable microsystems (e.g., portable analytical systems) with high fidelity.

In one embodiment, a pneumatic valve system is provided. The pneumatic valve system can include a fluidic control line having an inlet, an outlet, an pneumatic valve portion, and a gate chamber portion, each of which being in fluid communication with one another. The pneumatic valve system can further include a pressure source in fluid communication with the inlet. The pneumatic valve system may have an electrostatic gate comprising a first electrode and a second electrode. The gate chamber portion of the fluidic control line may be sandwiched between the first electrode and the second electrode. The pneumatic valve system may also have a fluidic channel fluidly separate from the fluidic control line. The pneumatic valve portion of the fluidic control line can be positioned relative to a portion of the fluidic channel such that expansion of the pneumatic valve portion restricts fluid flow through the fluidic channel.

In a further embodiment, a method of using a pneumatic valve system is provided. The method may include applying a pressure to a fluid in a fluidic control line and applying an electrical potential difference between a first electrode and a second electrode thereby moving the first and second electrodes toward one another thereby compressing a gate chamber portion of the fluidic control line between the first and second electrodes. The method may further include increasing pressure in a pneumatic valve portion of the fluidic control line thereby expanding the pneumatic valve portion and compressing a fluidic channel with the expanding pneumatic valve portion.

In another embodiment, an electrostatic actuator is provided. The electrostatic actuator can include a fluidic line comprising an inlet, an outlet, and a gate chamber portion, each of which being in fluid communication with one another. The electrostatic actuator also may have a first electrode and a second electrode such that gate chamber portion of the fluidic line is sandwiched between the first electrode and the second electrode. The electrostatic actuator may further include a pressure-balancing channel in fluid communication with the gate chamber portion. The first electrode can be sandwiched between the pressure-balancing channel and the gate chamber portion.

In one embodiment, a method of using an electrostatic actuator is provided. The method can include applying a pressure to a fluidic line comprising a gate chamber portion sandwiched between a first electrode and a second electrode. The method can further include equalizing a pressure in the gate chamber portion with a pressure in a pressure-balancing channel. The first electrode can be sandwiched between the pressure-balancing channel and the gate chamber portion.

DETAILED DESCRIPTION

Described herein are pneumatic valve systems and electrostatic gates and actuators. An active component of a pneumatic valve system can be an electrostatic gate. The electrostatic gate can modify the local hydraulic resistance of a fluidic control line, thereby modulating the pressure gradient and fluid flow in the fluidic control channel.

Further described herein are portable methods for generating pressure pulses on microfluidic chips that utilizes integrated electrostatic actuators as gates to regulate pressurized fluidic control lines. Only a small electrostatic "pressure" is needed to effect a large change in the local pneumatic pressure in a fluidic control channel; hence, the combination of a fluidic control channel and an electrostatic gate is referred to as a microfluidic pressure amplification circuit. By coupling electrostatic actuators with pneumatic microvalves to control fluid flow in a fluidly separate fluidic channel, any direct interaction between electric fields and aqueous solutions is circumvented, allowing use of direct current (DC) sources to drive the electrostatic actuators.

Figure 1:
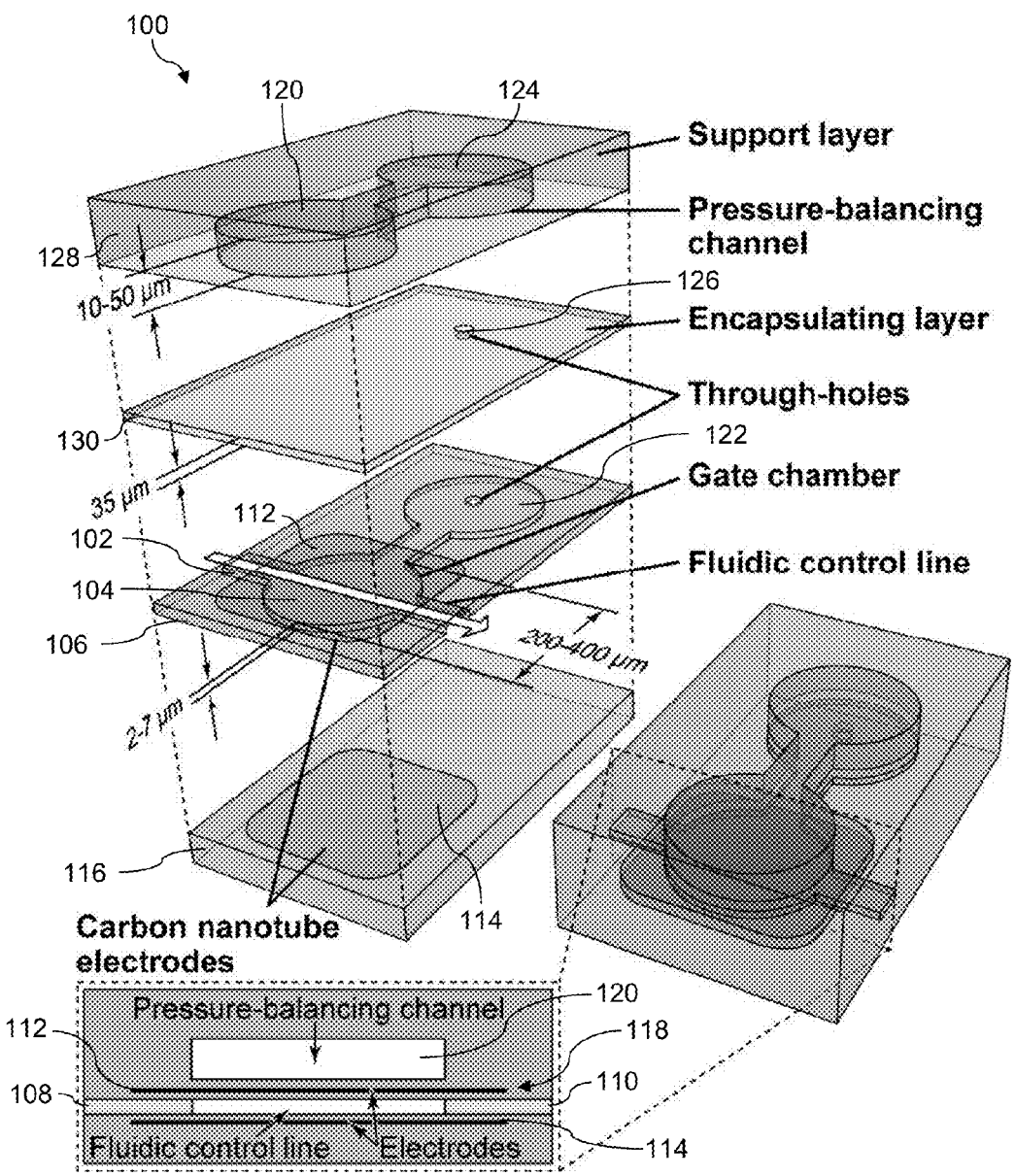
FIG. 1 is a schematic of an electrostatic gate in accordance with embodiments described herein.

FIG. 1 includes a perspective view, an exploded perspective view, and a cross-sectional view of a schematic of an electrostatic gate or actuator 100 that includes a fluidic control line or channel 102 having a gate chamber 104. The fluidic control line 102 and gate chamber 104 may be within an elastomeric material such as poly(dimethylsiloxane). The elastomeric material may have a Young's modulus of about 300 kPa to about 4 MPa. The elastomeric material may also be transparent to aid in visual observations and optical measurements. Furthermore, the fluidic control line 102 and the gate chamber 104 may be within a first layer or membrane 106. The gate chamber 104 may have a circular or cylindrical shape. The fluidic control line 102 has an inlet 108 and outlet 110 so that fluid can enter the inlet 108, flow through the fluidic control line 102, and exit the outlet 110.

The gate chamber 104 is sandwiched between a first electrode 112 and a second electrode 114. Material (e.g., elastomeric material) can be sandwiched between the first electrode 112 and the gate chamber 104, and material (e.g., elastomeric material) can be sandwiched between the second electrode 114 and the gate chamber 104 such that the first and second electrodes 112, 114 are spaced from the gate chamber 104 a distance such as about 0.1 μm to about 5 μm. For example, the first electrode 112 can be embedded within a membrane 118 adjacent to the gate chamber 104, and the second electrode 114 can be embedded within the substrate 116.

The electrodes 112, 114 can be formed of a material that is electrically conductive and able to withstand high stresses without mechanical failure. For example, the electrodes 112, 114 can be formed of multi-walled carbon nanotubes (MWNTs). Carbon nanotubes have high aspect ratios (ratios of length to width) that improve the percolation properties of intermeshed networks over those of other nanoparticles, allowing the formation of films that are both electrically conductive and transparent.

Figure 2:
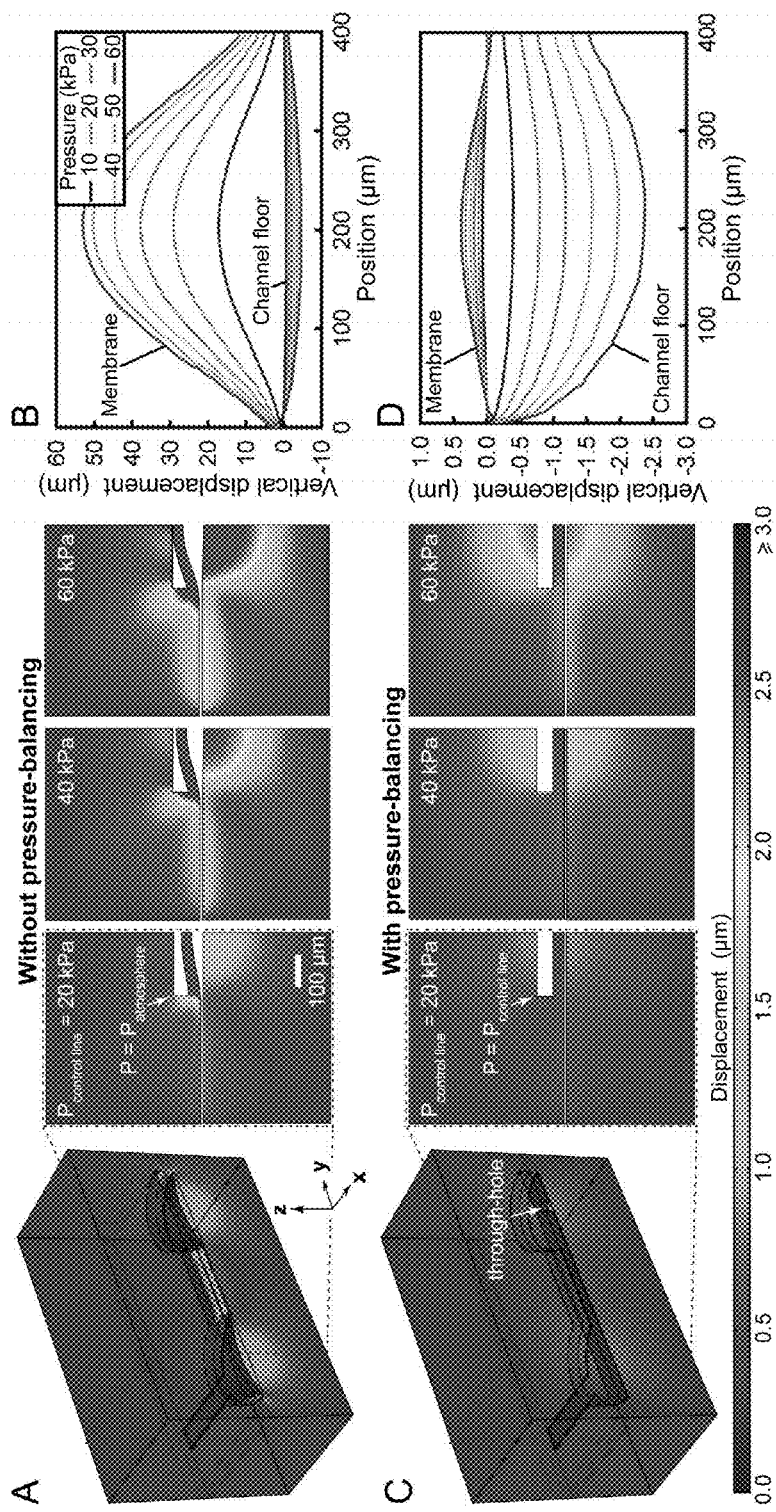
FIG. 2 includes data from simulations of the effect of applied pressure on the deflection of electrostatic gate structures using a finite element analysis method with: (A) three-dimensional model of the gate with ambient pressure above the membrane and higher pressure below the membrane; (B) graph of predicted vertical displacements of the membrane and channel floor as a function of position along the central x-z plane and pressure; (C) same as (A), only with equal pressure applied to the pressure-balancing channel and the fluidic channel; and (D) same as (B), only with equal pressure applied in the fluidic channel and the pressure-balancing channel.

When the fluidic control line 102 is pressurized, the pressure may cause the first electrode 112 and membrane 118 to deflect away from the gate chamber 104. The extent of these deflections was predicted with a finite element analysis package, COMSOL Multiphysics®, utilizing the solid mechanics module. The simulations showed that if a cavity above the first membrane was held at atmosphere, the center of the membrane 118 would deflect away from the first electrode 112 at a rate of up to 1.7 $\mu m\ kPa^{-1}$ at low pressures (<10 kPa), as shown in FIGS. 2A and 2B. A separate, semi-analytical model that was developed showed that deflections of this order would preclude the gate from actuating at reasonable potentials (<300 V) with pressures over 10 kPa. Even with a post centered in a cavity above the membrane 118, experimental studies showed that a pressure of 10 kPa was capable of nearly doubling the actuation potential.

To prevent or reduce the deflection of the membrane 118, the electrostatic gate 100 can include a pressure-balancing channel 120. The pressure-balancing channel 120 is in fluid communication with the gate chamber 104. The pressure-balancing channel 120 can be positioned such that the first electrode 112 is sandwiched between the pressure-balancing channel 120 and the gate chamber 104. The pressure-balancing channel 120 is in fluid communication with the gate chamber 104 by an extended channel 122 that extends from the gate chamber 104 in a first direction. The extended channel 122 may extend beyond the first electrode 112 such that the fluid communication can generally extend around the first electrode 112. An extended pressure-balancing channel 124 may extend from the pressure-balancing channel 120 in the first direction. A through-hole 126 may extend from the extended channel 122 to the extended pressure-balancing channel 124 so that the extended channel 122 and the extended pressure-balancing channel 124 are in fluid communication. The pressure-balancing channel 120 and the extended pressure-balancing channel 124 may be within a second layer 128 (e.g., support layer) different from the first layer 106 described above. The through-hole 126 can fluidly connect the first layer 106 and the second layer 128. Furthermore, the through-hole 126 may be within a third layer 130 (e.g., encapsulating layer) and extend through the third layer 130. The elastomeric material may be permeable to gas so that the pressure-balancing channel 120 can be filled with a fluid.

The fluid communication between the pressure-balancing channel 120 and the gate chamber 104 allows the pressure of the fluid on both sides of the membrane 118 to equilibrate. Simulations with the pressure-balancing channel 120 predicted deflections of the center of the membrane 116 of less than 0.01 $\mu m\ kPa^{-1}$, as shown in FIGS. 2C and 2D. In fact, the main contribution to the increase in the gap between the electrodes 112, 114 was predicted to be deflection of the elastomeric substrate 116. As such, a second pressure-balancing channel may be in fluid communication with the gate chamber 104, and the second pressure-balancing channel is positioned such that the second electrode 114 is sandwiched between the second pressure-balancing channel and the gate chamber 104. FIG. 1 also includes possible dimensions of various components, but other dimensions are also contemplated.

Figure 3:
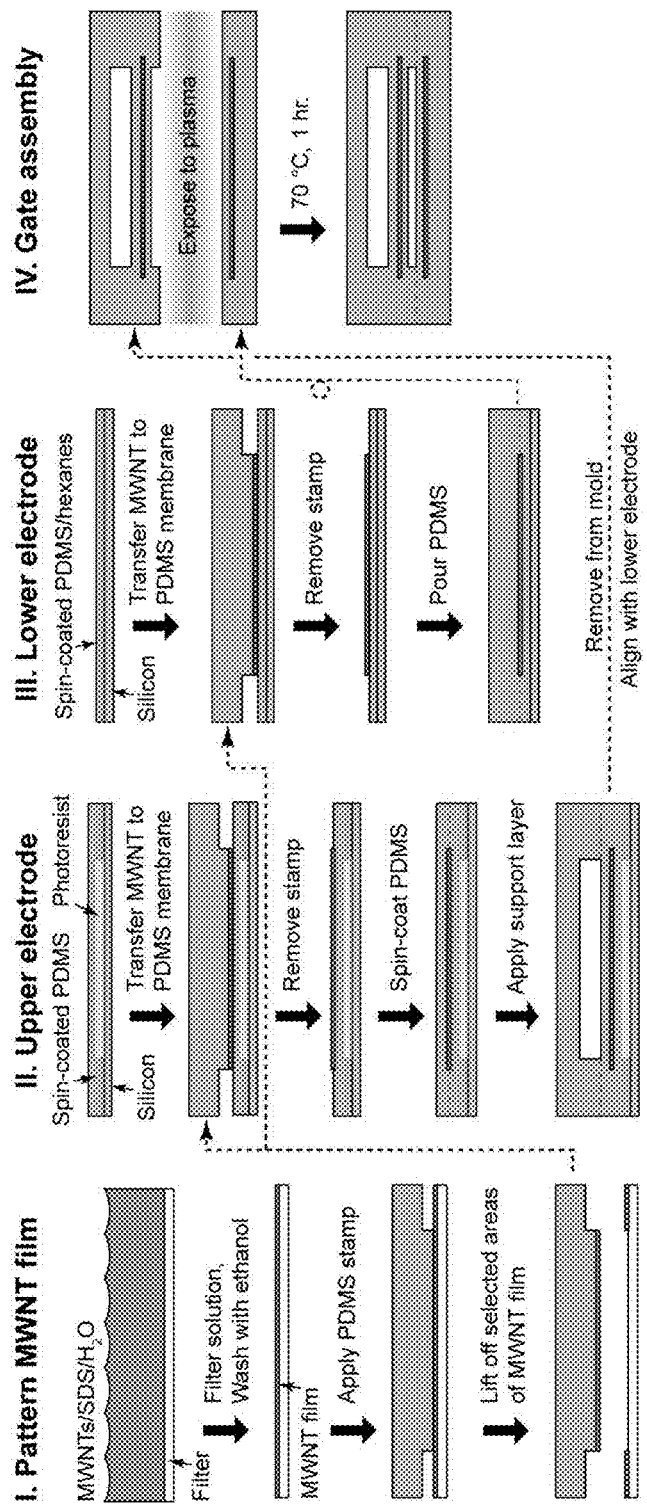
FIG. 3 is a schematic of a method of using soft-lithographic techniques for fabricating electrostatic gates.

FIG. 3 is a schematic of a method of fabricating an electrostatic gate 100 using a soft-lithographic method. Soft-lithographic techniques can also be used to form other components described herein such as fluidic control lines. For example, the entire electrostatic gate 100, microfluidic circuit, and/or pneumatic valve system may be fabricated using only soft-lithographic techniques.

Figure 4:
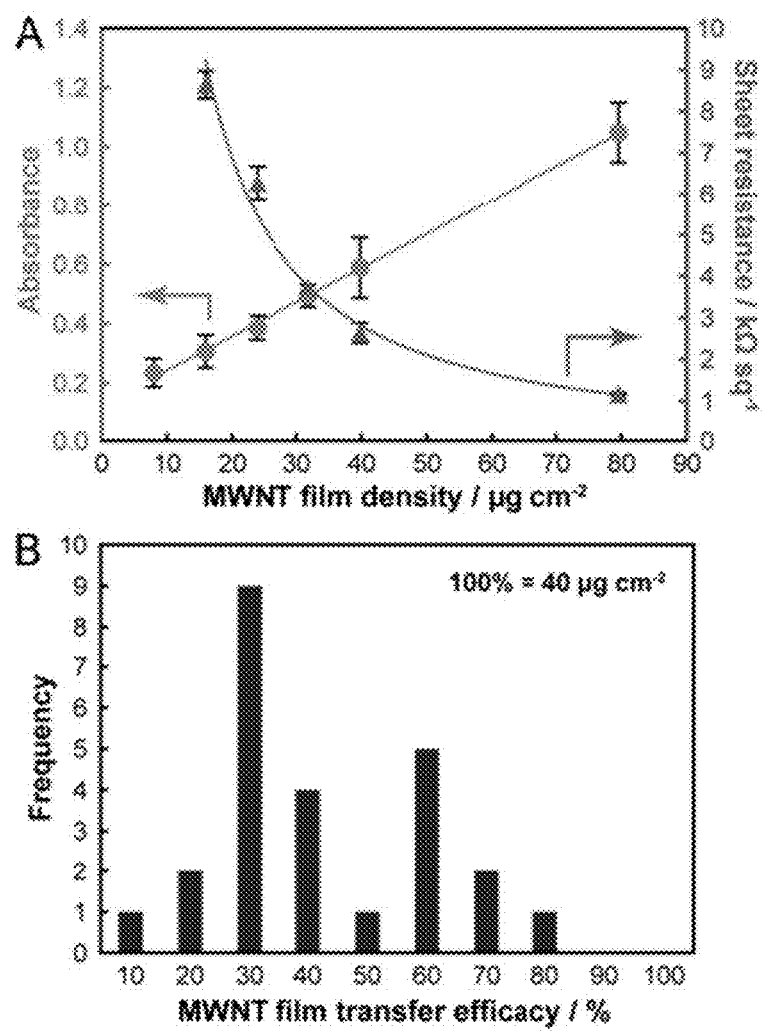
FIG. 4 includes characterization of electrodes made from multi-walled carbon nanotubes (MWNT) including: (A) a plot of quantification of film transparency and sheet resistance as a function of MWNT loading with error bars indicating one standard deviation; and (B) a histogram showing the extent of MWNT transfer from poly(dimethylsiloxane) (PDMS) stamps to PDMS substrates in a sample of 25 devices, as determined by light absorbance at 400 nm, and the MWNT films had an initial loading of ca. 40 μg cm$^{-2}$ before transfer.

A thin layer of poly(dimethylsiloxane) (PDMS) is first spin-coated over a mold with features that define the fluidic control channel. A thin film of MWNTs was formed by filtering an aqueous solution of MWNTs and surfactant through an alumina membrane, followed by a wash with ethanol to remove the surfactant. A patterned PDMS stamp was used to lift off selected areas of the MWNT film and then transfer them to the cured PDMS substrate. The transparency of the MWNT film allowed alignment to be performed in a straight-forward manner. Characterization of the MWNT electrodes, including optical absorbance and sheet resistance as functions of particle loading, are shown in FIG. 4 along with characterization of the transfer printing method. A mixture of PDMS and MWNTs was placed on the contact pads to facilitate electrical contact with a power source during experimentation. A second encapsulating layer of PDMS was then spin-coated, allowed the layer to partially cure, and then placed a PDMS support layer on top. A mismatch in the ratio of curing agent between the membrane and the support layer allowed the layers to permanently seal. The lower electrode was fabricated separately in a manner similar to the membrane. A thin layer of PDMS diluted in hexanes was spin-coated and cured on a featureless silicon wafer. A film of MWNTs was then transfer printed; electrical contacts were formed, and then a thick layer of PDMS was poured over the MWNT film and cured. To seal the upper section of the gate to the lower electrode, both sides were exposed to brief oxygen plasma treatment, aligned, and then heated at 70° C. for at least one hour.

Molds for channels and gate chambers were made by patterning SU-8 5 photoresist (Microchem Corp.) with standard photolithographic techniques onto silicon wafers. For channels 2 µm tall, the photoresist was spun at 7,200 rpm for 30 s, and for channels 7 µm tall, the photoresist was spun at 1,700 rpm for 30 s. For some of the molds, SU-8 posts were added to form through-holes for the electrostatic gates. To form the posts, SU-8 50 was spin-coated on top of the previously formed features at 1,500 rpm for 30 s and then processed according to the manufacturer's specifications. Molds for the support layer were fabricated using either SU-8 50 (spun at 2000 rpm for 30 s) or SU-8 5 (spun at 3000 rpm for 30 s). Molds for the stamps were fabricated using SU-8 50 spun at 2000 rpm for 30 s. To reduce adhesion between PDMS and the molds, a surface treatment was performed by placing the molds in a vacuum desiccator along with several drops of (tridecafluoro-1,1,2,2-tetrahydrooctyl)trichlorosilane (Gelest, Inc.) and then applying a vacuum overnight.

To construct the upper layers of the gate, a thin layer of PDMS (20 monomer:1 curing agent weight ratio, General Electric RTV 615, Hisco, Inc.) was first spin-coated onto the mold at 10,000 rpm for 300 s (for 2 µm tall channels) or 50 s (for 7 µm tall channels) such that a thin film covered the channel features but not the SU-8 posts for the through-holes. The PDMS film was cured in an oven at 70° C. for 1 h and then allowed to cool to room temperature. To form a thin film of multi-walled carbon nanotubes, an aqueous suspension of MWNTs (20-30 nm outer diameter, 10-30 µm length, >95 wt % purity, ash<1.5 wt %, Cheaptubes, Inc.) with a ratio of 1 g MWNTs:10 g sodium dodecyl sulfate:1 mL deionized water was prepared and sonicated with a probe (Vibra-Cell VCX130PB, Sonics & Materials, Inc.) for approximately 30 min to solubilize the MWNT. A 0.5-1 mL sample was then diluted into approximately 20-30 mL deionized water and stirred briefly. The dilute suspension was filtered through a membrane filter (Anodisc™ inorganic membrane, 0.1 or 0.2 μm pore size, 47 mm diameter, Whatman) that had been wet with ethanol.

After the aqueous suspension had fully passed through the membrane, the MWNT that remained on the membrane were washed with ethanol until the filtrate was free of bubbles. A PDMS stamp (20 monomer:1 curing agent weight ratio, cured overnight at 70° C.) was brought into contact with the MWNT film. Areas in contact with the stamp were lifted off the membrane filter and then applied to the PDMS film formed previously. Pressure was applied by hand, and after lifting off the PDMS stamp, a fraction of the MWNT film transferred to the PDMS film. Electrical contacts were made from a mixture of PDMS (5 monomer:1 curing agent weight ratio) and 10 wt % MWNTs, which was applied at two corners of the MWNT film and subsequently cured for 15 min in an oven at 70° C. To encapsulate the MWNT electrode, a second layer of PDMS (20 monomer:1 curing agent weight ratio) was spin-coated on top of the electrode at 3000 rpm for 30 s and allowed to cure until tacky in an oven at 70° C. for 20-30 min. The PDMS support layer (5 monomer:1 curing agent weight ratio; cured at 70° C. for 1 h) was aligned onto the membrane; uncovered regions of the spin-coated PDMS layers were filled with liquid PDMS (5 monomer:1 curing agent weight ratio) and the whole assembly was cured overnight in an oven at 70° C. The support layer sealed permanently to the membrane due to the mismatch of curing agent concentration between the layers. The upper layers of the gate were removed from the mold and holes were punched to the inlets of the microchannels using a sharpened 20 gauge steel needle. If through-holes were not formed previously by means of SU-8 posts incorporated into the molds, the through-holes were cut with a scalpel or sharpened needle.

To fabricate the lower electrode for the gate, a featureless silicon wafer was treated with silane vapor as described previously, and a thin layer of PDMS (20 monomer:1 curing agent weight ratio), diluted in hexanes (10 hexanes:1 PDMS weight ratio) was spin-coated onto the wafer at 10,000 rpm for 120 s. The thin PDMS layer was cured in an oven at 70° C. for 1 h, and then a MWNT film was applied as described above. Electrical contacts were also applied, and the wafer was then covered with a layer of PDMS (5 monomer:1 curing agent weight ratio) several millimeters thick. The PDMS was cured overnight at 70° C.

To integrate a pneumatic microvalve into the layer containing the lower electrode, the fabrication was modified as follows. After spin-coating a thin layer of PDMS, transferring the MWNT film, and applying the electrical contacts, a second layer of PDMS (20 monomer:1 curing agent weight ratio) was spin-coated at 2400 rpm for 30 s. The PDMS was cured at 70° C. for 20-30 min until slightly tacky, and then another layer of PDMS (5 monomer:1 curing agent weight ratio; cured at 70° C. for at least 1 h) with a rounded microchannel was aligned and placed on top. Uncovered regions of the spin-coated PDMS layers were filled with liquid PDMS (5 monomer:1 curing agent weight ratio) and the whole assembly was cured overnight at 70° C.

To seal the upper layers of the gate to the lower electrode, both surfaces participating in the seal were exposed to oxygen plasma generated with an atmospheric plasma system (Atomflo™ 400L system equipped with an AH-250L head, Surfx Technologies). The system was configured to 100 W RF power with an oxygen flow rate of 0.03 L min$^{-1}$ and a helium flow rate of 15.0 L min$^{-1}$. Both surfaces were passed three times under the plasma for about one second each pass. Immediately after, the surfaces were aligned and brought into contact. To complete the seal, the device was heated at 70° C. for at least 1 h. Membranes in gates with shallow chambers tended to collapse during fabrication and seal permanently to the channel floor. To prevent this, the pressure-balancing channel was designed to be shallow for gates with 2 μm tall chambers so that the membranes could be reversibly adhered to the top of the pressure-balancing channels during fabrication and released later by filling the channels with oil. Membranes did not collapse as readily for gates with 7 μm heights, so the pressure-balancing channels were designed taller.

The behavior of the electrostatic gate 100 was also characterized so that its performance in a microfluidic pressure-amplification circuit could be predicted. The electrostatic gate 100 regulated the flow and pressure gradient in a fluidic control line 102 by modulating the local hydraulic resistance. When the membrane 118 is not in contact with the substrate 116, the gate is referred as being "open," and when the membrane 118 is in contact with the substrate 116, the gate is referred as being "closed," as illustrated by the schematic in FIG. 5a.

Figure 5:
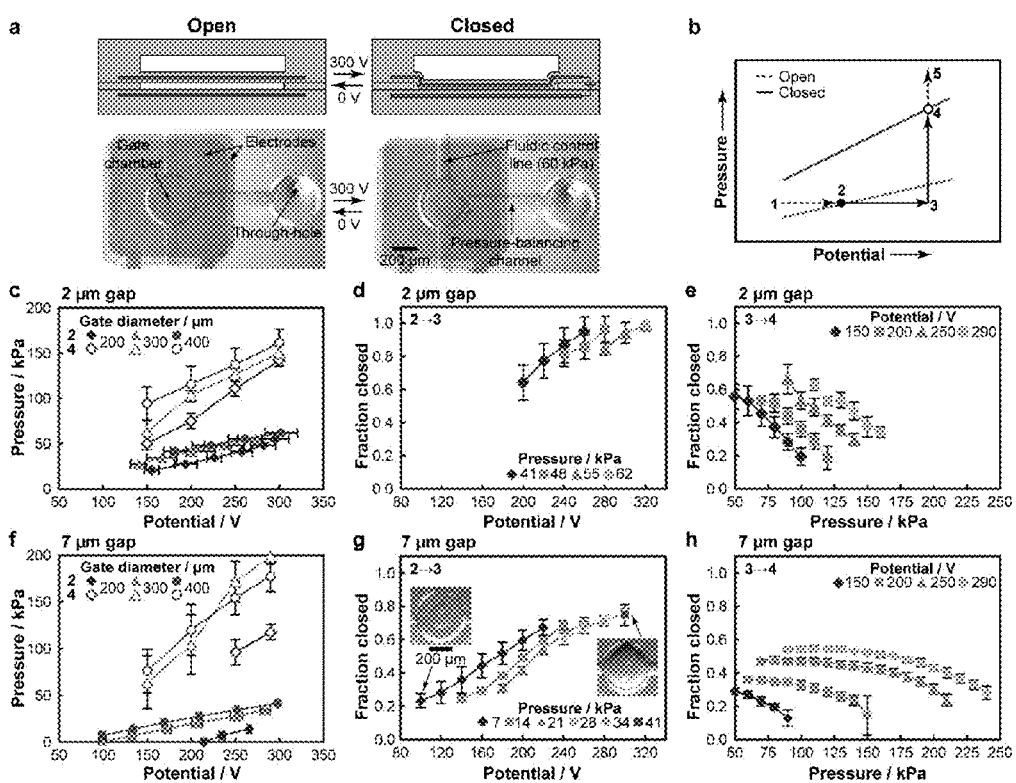
FIG. 5 includes characterization of membrane actuation including: (a) schematics of cross-sectional views and micrographs of top views of an electrostatic gate in the open and closed states with an electric potential of 300 V used to actuate the gate with an applied pressure of 60 kPa, the gate having a diameter of 400 μm, and a gap of 7 μm between the membrane and the substrate; (b) a graphic representation of a test cycle; (c) a graph of the threshold potentials needed to close (e.g., establish initial contact between the membrane and the substrate) electrostatic gates at fixed pressures (solid symbols), and the threshold pressures needed to re-open the gates at fixed potentials (open symbols) with the initial gap between the membrane and the channel floor being 2 μm; (d) a graph showing the fraction of a gate's membrane in contact with the substrate as a function of electric potential when the pressure was held constant with the initial gap being 2 μm; (e) a graph showing the fraction of a gate's membrane in contact with the substrate as a function of pressure when the potential was held constant with the initial gap being 2 μm; (f-h) same as (c-e), respectively, only the initial gap was 7 μm (error bars indicate one standard deviation)

Efficacy of shutting off fluid flow in the fluidic control line 102 was measured. When an electric potential was applied across the electrodes 112, 114, the membrane 118 deflected stably until the restoring mechanical forces in the membrane 118 no longer balanced the electrostatic force, resulting in instability. Beyond this threshold, the membrane 118 collapsed suddenly onto the substrate 116. The electric potential at the threshold is defined as the actuation potential. By including a pressure-balancing channel 120, the electrostatic gates were able to be actuated with potentials less than 300 V while applying substantial pressures to the fluidic control line 102. The actuation potential was characterized as a function of hydraulic pressure, the diameter of the gate, and the distance between the membrane and the channel floor. For a set pressure, the electric potential between the electrodes 112, 114 was slowly increased (Path 1→2 in FIG. 5b) until the membrane 118 snapped shut against the substrate 116 (Point 2 in FIG. 5b). The actuation potential was found to increase linearly with applied pressure over the range tested, and gates with larger diameters required less potential to actuate at a given pressure (FIGS. 5c and 5f; solid symbols). For this reason, further studies focused on gates with diameters of 400 μm. With a diameter of 400 μm and a gap of 7 μm, gates were able to actuate with applied pressures up to 41 kPa with an actuation potential of 298 V±1 (s.d.). With a diameter of 400 μm and a gap of 2 μm, gates were able to actuate with applied pressures up to 62 kPa with an actuation potential of 302 V±18 (s.d). As such, electrostatic gates 100 can actuate or close, for example, by applying an electrical potential between the first and second electrodes between about 10 and about 1000 V or between about 100 and about 500 V. Furthermore, the electrostatic gates 100 can actuate or close, for example, with a pressure in the fluidic control line 102 between about 5 and about 200 kPa or between about 20 and about 100 kPa.

The dashed lines in FIG. 5b indicate when the membrane 118 was not in contact with the substrate 116 (the electrostatic gate 100 in an "open" state) and the solid lines in FIG. 5b indicate when the membrane 118 was in contact with the substrate 116 (the electrostatic gate 100 in a "closed" state). Once the electrostatic gate 100 was closed, the area of the membrane 118 in contact with the substrate 116 can be reversibly tuned by adjusting the electric potential (Path 2→3 in FIG. 5b; see also micrographs in FIG. 5g). When the fluidic control line was 2 μm tall, the membrane 118 was able to be brought into nearly full contact with the substrate 118 (FIG. 5d), but at pressures lower than 40 kPa, the membrane 118 did not supply sufficient restoring force to completely lift the membrane 118 off the substrate 116 when the electric potential was released. For electrostatic gates 100 with fluidic control lines 102 that were 7 μm deep, the dynamic range extended to pressures as low as 7 kPa; however, they were only able to close up to approximately 75%, as shown in FIG. 5g.

After actuation, the area of the membrane 118 in contact with the substrate 116 decreased with increasing pressure at a fixed potential (Path 3→4 in FIG. 5b). The pressure required to force the membrane 118 off the substrate 116 was higher than the initial pressure associated with the actuation potential (Point 4 in FIG. 5b), and 2.5 times higher for gates with 2 μm tall channels and diameters of 400 μm (see FIG. 5c) and more than 4 times higher for gates with 7 μm tall channels and diameters of 400 μm (see FIG. 5f). Again, shallower channels were capable of accessing higher membrane closure, while deeper channels had larger dynamic range (see FIGS. 5e and 5h). As such, the gate chamber 104 may, for example, have a thickness between about 0.5 to about 20 μm, between about 1 and about 10 μm, or between about 2 and about 7 μm. Furthermore, the gate chamber 104 may, for example, have a diameter of about 100 to about 1000 μm or of about 200 to about 500 μm and/or an area adjacent to the electrodes 112, 114 of about 8,000 μm² to about 1 mm² or of about 30,000 to about 200,000 μm². In addition, the gate chamber 104 may, for example, have a volume of about 8,000 μm³ to about 0.01 mm³ or of about 30,000 μm³ to about 0.002 mm³.

Figure 6:
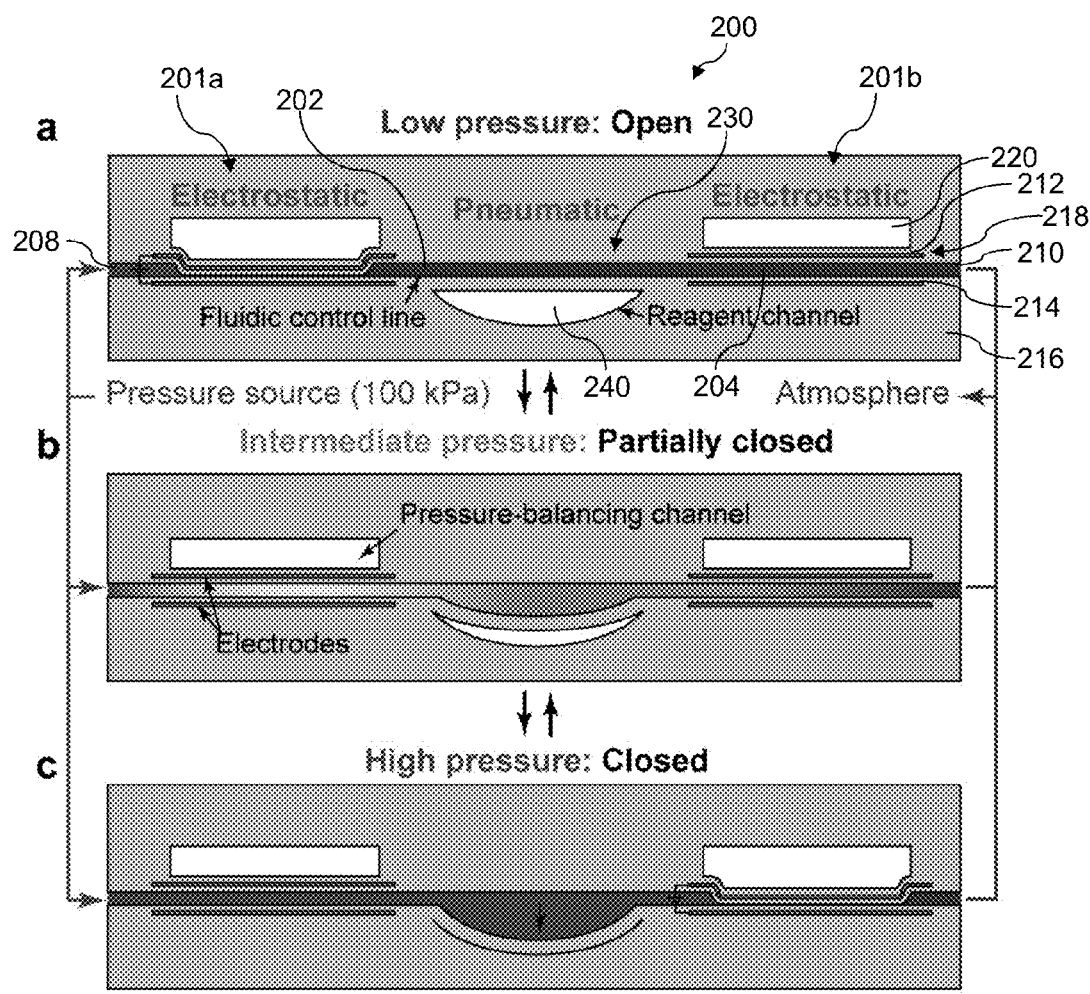
FIG. 6 includes cross-sectional schematics of a pneumatic valve system having two electrostatic gates where (a) the first electrostatic gate is closed and the second electrostatic gate is open, (b) both electrostatic gates are open, and (c) the first electrostatic gate is open and the second electrostatic gate is closed.

FIG. 6 is cross-sectional view of a pneumatic valve system 200 that includes two electrostatic gates 201. However, a pneumatic valve system 200 may only include one electrostatic gate 201. The electrostatic gate 201 can be the electrostatic gate 100 described above or it can be a different configuration. For example, electrostatic gate 201 may or may not include a pressure-balancing channel. Furthermore, description of the electrostatic gate 201 can also be applicable to the electrostatic gate 100 described above.

The electrostatic gate 201 may include a fluidic control line 202 having a gate chamber 204. The fluidic control line 202 has an inlet 208 and outlet 210 so that fluid can enter the inlet 208, flow through the fluidic control line 202, and exit the outlet 210.

The gate chamber 204 is sandwiched between a first electrode 212 and a second electrode 214. Material (e.g., elastomeric material) can be sandwiched between the first electrode 212 and the gate chamber 204, and material (e.g., elastomeric material) can be sandwiched between the second electrode 214 and the gate chamber 204 such that the first and second electrodes 212, 214 are spaced from the gate chamber 204 a distance. For example, the first electrode 212 can be embedded within a membrane 218 adjacent to the gate chamber 204, and the second electrode 214 can be embedded within the substrate 216.

The pneumatic valve system 200 can further include a pressure source in fluid communication with the inlet 208. The pressure source can be pressurized gas source such as a gas cylinder containing pressurized nitrogen, carbon dioxide, etc., a syringe containing gas that is either manually compressed or compressed with a syringe pump, a bellows, a compressor, or a reservoir that contains a chemical reaction that generates a gaseous product. The pressure source may apply, for example, a pressure of between about 5 and about 200 kPa or between about 20 and about 100 kPa. The fluidic control line 202 further includes a pneumatic valve portion 230 configured to expand upon an increase in pressure within the pneumatic valve portion 230. Furthermore, the pneumatic valve portion 230 may have a cross-sectional area greater than other portions of the fluidic control line 202.

Figure 7:
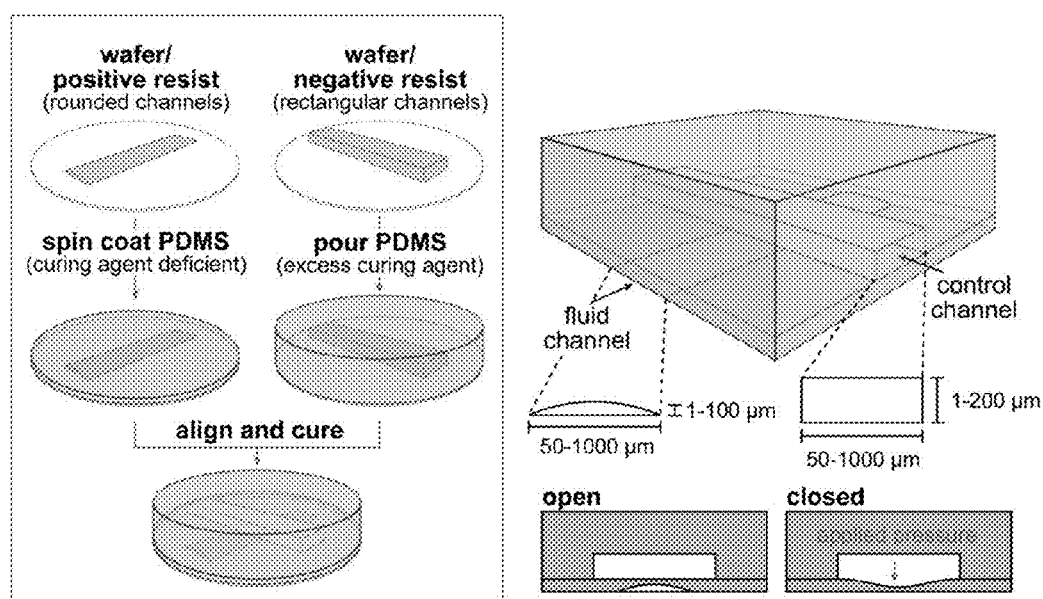
FIG. 7 includes a schematic of a soft-lithographic fabrication method for pneumatic microvalves, a perspective view of a microvalve, and cross-sectional views of the microvalve illustrating actuation.

The pneumatic valve system 200 further includes a fluidic channel 240 fluidly separate from the fluidic control line 202. For example, the fluidic control line 202 and the fluidic channel 240 may be in different layers such as the fluidic control line 202 is in a first layer and the fluidic channel 240 is in a second layer or the substrate 216. FIG. 7 includes a schematic of a pneumatic valve portion 230 of the fluidic control line 202 and a portion of the fluidic channel 240. An elastomeric membrane can separate the fluidic control line 240 from the pneumatic valve portion 230 of the fluidic control line 202. The pneumatic valve portion 230 and the fluidic channel 240 may be spaced a distance of about 5 to about 200 μm. The pneumatic valve portion 230 of the fluidic control line 202 is adjacent or neighboring a portion of the fluidic channel 240 such that upon an increase in pressure within the pneumatic valve portion 230, the pneumatic valve portion 230 expands thereby compressing the fluidic channel 240 which restricts fluid flow in the fluidic channel 240. The elastomeric membrane can deflect more easily than the thicker slab of elastomeric material (e.g., PDMS) surrounding the rest of the fluidic control line 240. FIG. 7 includes possible dimension of the fluidic control line 202 and the fluid channel 240, but other dimensions are also contemplated.

The first electrode 212 and the second electrode 214 are able to move toward one another when an electrical potential difference is applied between the first and second electrodes 212, 214 to compress the gate chamber 204 of fluidic control line 202 thereby restricting fluid flow through the fluidic control line 202. Upon restricting fluid flow through the fluidic control line 202, the pneumatic valve portion 230 of the fluidic control line 202 compresses the fluidic channel 240 thereby restricting fluid flow through the fluidic channel 240. Upon restricting fluid flow through the fluidic control line 202, the pneumatic valve portion 230 of the fluidic control line 202 expands. As discussed above, the pneumatic valve system 200 may include more than one electrostatic gate 201. For example, the electrostatic gate 201 can be a first electrostatic gate, and the fluidic control line 202 comprises a second electrostatic gate such that the pneumatic valve portion 230 is fluidly between the first electrostatic gate and the second electrostatic gate.

FIG. 6 also illustrates an example use of a pneumatic valve system 200 that uses two electrostatic gates 201 to selectively change the size of the fluidic channel 240 with three different sizes. In FIG. 6a, the first electrostatic gate 201a is closed and the second electrostatic gate 201b is open. The pressure in the pneumatic valve portion 230 is lower and the fluidic channel 240 is open more than that in the configurations illustrated in FIGS. 6b and 6c. In FIG. 6b, the first electrostatic gate 201a and the second electrostatic gate 201b are open. The pressure in the pneumatic valve portion 230 is higher and the fluidic channel 240 is more closed than that in the configuration illustrated in FIG. 6a while the pressure in the pneumatic valve portion 230 is lower and the fluidic channel 240 is less closed than that in the configuration illustrated in FIG. 6c. In FIG. 6c, the first electrostatic gate 201a is open and the second electrostatic gate 201b is closed. The pressure in the pneumatic valve portion 230 is higher and the fluidic channel 240 is more closed that that in the configuration illustrated in FIGS. 6a and 6b.

Figure 8:
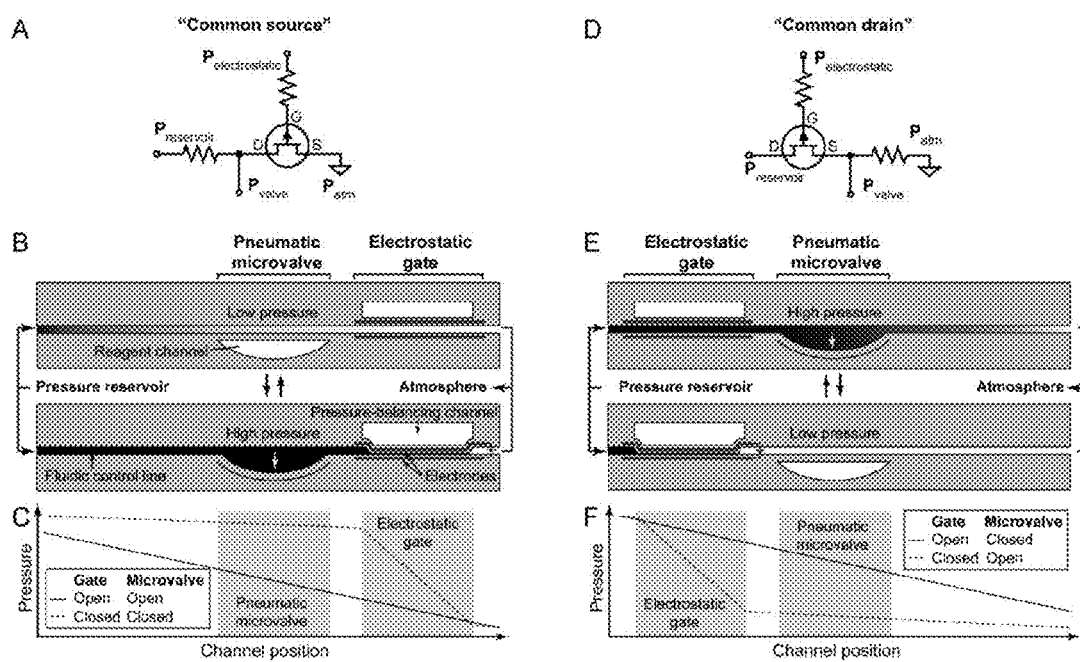
FIG. 8 includes fluidic amplifier circuits utilizing electrostatic gates illustrating (A) an electrical circuit equivalent of a fluidic amplifier (single-stage field-effect transistor amplifier in the "common source" configuration; D: drain; G: gate, S: source); and (B) a diagram of a "common source" fluidic amplifier where the gate is downstream of the pneumatic microvalve and both are located near the fluidic control line outlet; (C) a qualitative graph of the pressure drops in the fluidic circuit with the gate open or closed; (D) an electrical circuit equivalent of a fluidic amplifier (single-stage field-effect transistor amplifier in the "common drain" configuration); and (E) a diagram of a "common drain" fluidic amplifier where the gate is upstream of the pneumatic microvalve and both are located near the fluidic control line inlet; and (F) a qualitative graph of the pressure drops in the fluidic circuit with the gate open or closed.

An electrostatic gate may be used analogously to a junction field-effect transistor (JFET) in a common-source amplifier circuit (FIG. 8A) as illustrated in FIG. 8B. In this analogy, the direction of fluid flow is equated with the direction of conventional current flow, and pressure is equated with voltage. FIG. 8A shows the electrostatic gate as a p-channel JFET, since positive pressure generated by electrostatic forces constricted the channel. To regulate the pressure of a pneumatic control line, the electrostatic gate was placed near the outlet of the microchannel, which was vented to atmosphere, while a positive pressure ($P_{reservoir}$) was applied to the inlet. With the gate open, a pressure gradient developed in the fluidic control line such that the pressure in the pneumatic valve portion of the fluidic control line was inadequate to completely impinge into the fluidic channel. Actuating the gate with an electrostatic pressure, $P_{electrostatic}$, increased the fluidic resistance of the circuit or even completely blocked flow, causing a build-up of pressure on the "drain" side of the gate ($P_{valve}$) (FIG. 8C), which caused the pneumatic microvalve to close, as illustrated in FIG. 8B.

An electrostatic gate may also be used analogously to a JFET in a common-drain amplifier circuit (FIG. 8D) as illustrated in FIG. 8E. To regulate the pressure of a pneumatic control line, the electrostatic gate was placed near the inlet of the microchannel, where a positive pressure ($P_{reservoir}$) was applied. The pneumatic microvalve was placed just downstream of the gate, such that when the gate was open, the pressure in the pneumatic valve portion of the fluidic control line ($P_{valve}$) was high enough to completely impinge into the fluidic channel. Actuating the gate with an electrostatic pressure, $P_{electrostatic}$, increased the fluidic resistance of the circuit or even completely blocked flow, causing the pressure on the "source" side of the gate ($P_{valve}$) to drop, as illustrated in FIG. 8F, which opened the pneumatic microvalve.

Figure 9:
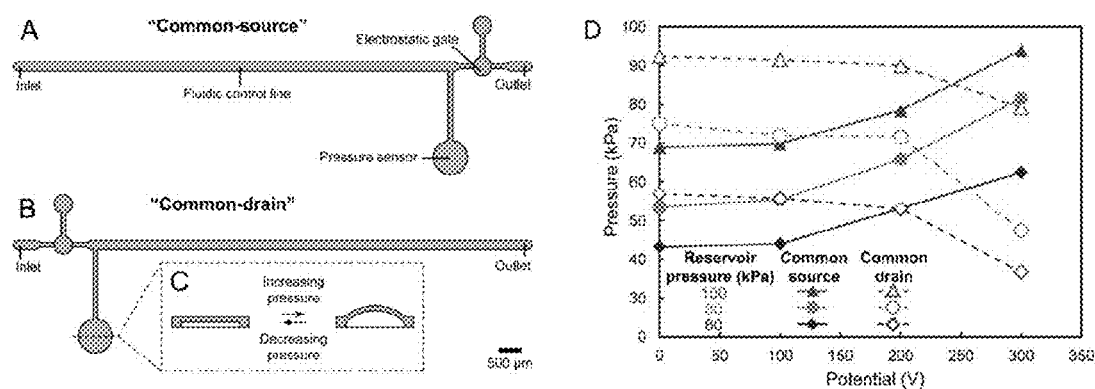
FIG. 9 includes fluidic pressure amplifier circuits with integrated pressure sensors illustrating (A) a fluidic circuit in the "common-source" configuration; (B) a fluidic circuit in the "common-drain" configuration; (C) a pressure sensor where the extent of a membrane's deflection indicates the pressure in the chamber below; and (D) a graph of pressure amplification as a function of the electric potential applied to the electrostatic gate with the initial gap distance of 2 μm and diameter of 400 μm.

To measure the pressures generated by the fluidic amplifier circuit ($P_{valve}$), a microfluidic pressure sensor was designed that included a circular fluidic chamber attached to the fluidic control line (see FIGS. 9A and B). A membrane was suspended above the fluidic chamber of the pressure sensor (see FIG. 9C), such that pressurization of the chamber caused the membrane to flex. Reference marks were patterned into the membrane, allowing the amount of flexing to be quantified and calibrated. Pressure sensors were integrated into "common-source" (FIG. 9A) and "common-drain" (FIG. 9B) fluidic amplifier circuits where pneumatic valves would generally be located, and the pressures at these locations were measured as a function of the pressure at the inlet and the electric potential applied to the electrostatic gates. In a "common-source" fluidic amplifier circuit, increasing the electric potential from 0 V to 300 V caused the pressure measured by the sensor to increase by approximately 20 kPa for all inlet pressures tested (60, 80, and 100 kPa) (see FIG. 9D). In a "common-drain" fluidic amplifier circuit, increasing the electric potential from 0 V to 300 V caused the pressure measured by the sensor to decrease between 10-20 kPa. The electrostatic gate may potentially withstand higher pressures and provide even higher amplification if the stiffness of the lower electrode was increased (e.g., by fabricating the electrode from an indium tin oxide film deposited on glass and covered with a thin insulating layer of PDMS.

Figure 10:
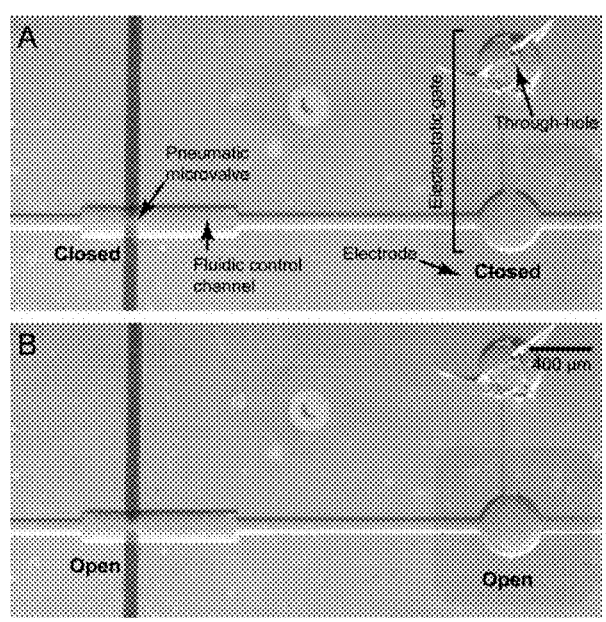
FIG. 10 includes a pneumatic microvalve controlled with a pressure amplifier circuit illustrating (A) a micrograph of the circuit with the electrostatic gate not actuated and the pneumatic microvalve open; and (B) a micrograph of the circuit with the electrostatic gate actuated and the pneumatic microvalve closed where the inlet pressure for the control line was 100 kPa and the electrostatic gate was actuated at 300 V.
Figure 11:
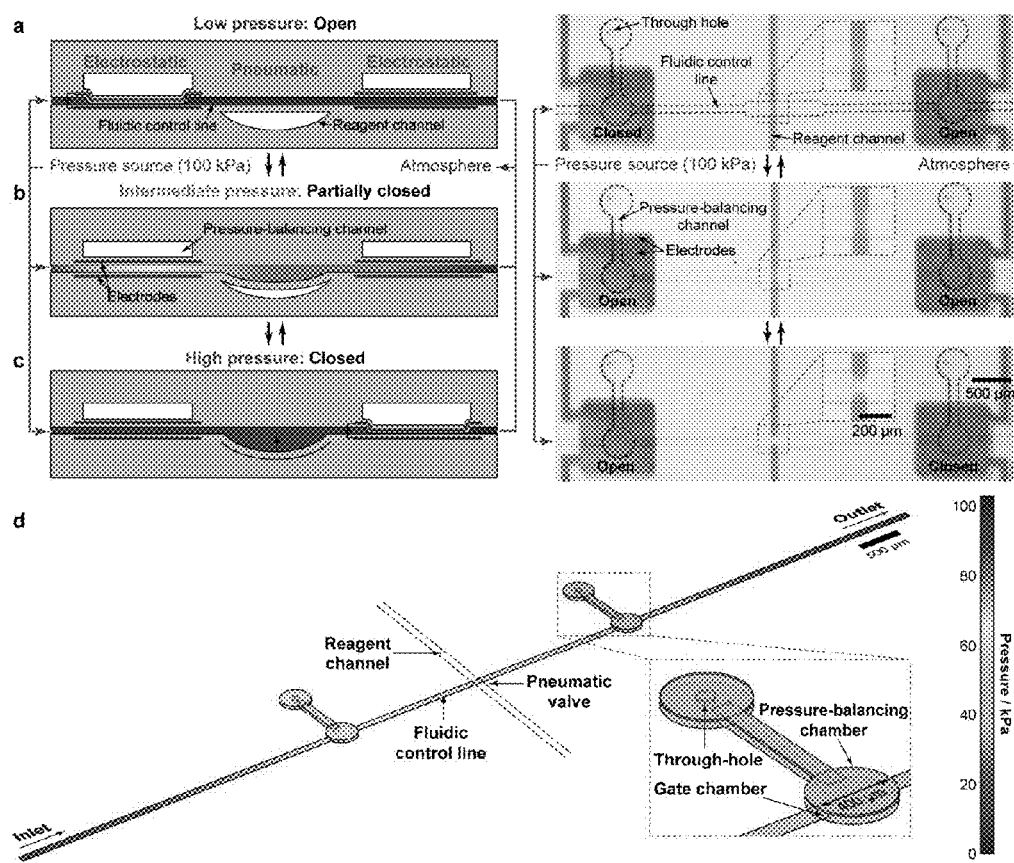
FIG. 11 includes demonstration of a pneumatic microvalve controlled with two integrated electrostatic gates with illustrations and micrographs correspond to (a) the open state for the pneumatic microvalve; (b) an intermediate state where both electrostatic gates are open, resulting in a pressure gradient in the fluidic control line that partially closes the pneumatic microvalve; and (c) the closed state for the pneumatic microvalve; and (d) a simulation of the fluid circuit used for predicting the pressure drop corresponding to the intermediate state.

The pressure sensors in the test circuits were replaced with normally-open pneumatic microvalves to demonstrate how the electrostatic gate could be used for flow control in pneumatic microsystems (see FIG. 10). The fluid layer of the pneumatic microvalve was 100 μm wide and 10 μm tall while the width of the fluidic control line was 200 μm. The thickness of the membrane in the pneumatic microvalve was 35 μm. Using a "common-source" fluidic amplifier circuit, the pneumatic microvalve was able to close fully with an inlet pressure of 100 kPa and an electric potential of 300 V applied. When only one electrostatic gate was used to control a single control line, hydraulic fluid flowed out of the device at a rate inversely proportional to the fluidic resistance of the circuit. To reduce the amount of leakage, a second electrostatic gate could be placed upstream of the pneumatic microvalve to decrease fluid flow while simultaneously allowing the pressure in the pneumatic valve portion of the fluidic control line to equilibrate with atmosphere (see FIG. 11).

Touch-mode electrostatic actuators commonly face the issue of drift in actuation potential due to a build-up of charge on the surfaces of electrodes. Either actuation potentials become prohibitively high, or the elements of the actuator fuse together, precluding further operation. Electrostatic gates described here were cycled continuously more than 2000 times, without observing these common failure modes, which, without being bound by theory, is believed due to the material symmetry between the membrane and the lower electrode. Instead, actuation was eventually inhibited by a loss of conductivity between the electrical controls and the electrical circuits in the device. Once the connection was reset, the gate was able to actuate more than 2000 times again before the same failure mechanism reemerged. Without being bound by theory, it is hypothesized that the small cross-sectional area of contact between electrical controls and the microfluidic device induced high current fluxes at the interface, which gradually burned out the connection. Future failure rates could be mitigated by using connections with larger cross-sectional interfaces, perhaps in conjunction with liquid metals to mediate contact between the conductive polymers and electrical wiring.

Because the electrostatic gates are on the same length scale as common pneumatic microvalves, the electrostatic gates have the potential to scale well with highly integrated microfluidic devices. With electrostatic gates integrated on-chip, only one pneumatic connection may be required and electrical interconnections could be standardized. While a parallel instruction approach was demonstrated, the electrostatic gates may also greatly benefit serial instruction schemes when combined with cascading pneumatic logic structures. For instance, serial instruction may require a clocking and triggering signal, which could be controlled directly on-chip with the electrostatic gate described herein instead of with external solenoid valves.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A pneumatic valve system comprising:
a fluidic control line having an inlet, an outlet, a pneumatic valve portion, and a gate chamber portion in fluid communication;
a pressure source in fluid communication with the inlet;
an electrostatic gate comprising a first electrode and a second electrode, wherein the gate chamber portion of the fluidic control line is sandwiched between the first electrode and the second electrode;
a pressure-balancing chamber having a common inlet and outlet, in continuous communication with the fluidic control line through a channel; and the first electrode is located between the pressure-balancing chamber and the gate chamber portion;
a fluidic channel fluidly separate from the fluidic control line, the pneumatic valve portion of the fluidic control line being positioned relative to a portion of the fluidic channel such that expansion of a portion of the fluidic control line restricts fluid flow through the fluidic channel
wherein the gate chamber is in a normally-open position when a voltage is not applied to the first and the second electrodes.

2. The pneumatic valve system of claim 1, wherein the first electrode and the second electrode are able to move toward one another when an electrical potential difference is applied between the first and second electrodes to compress the gate chamber of the fluidic control line thereby restricting fluid flow through the fluidic control line.

3. The pneumatic valve system of claim 2, wherein, upon restricting fluid flow through the fluidic control line, the pneumatic valve portion of the fluidic control line expands.

4. The pneumatic valve system of claim 1, wherein the pressure source applies a pressure of about 10 to about 200 kPa.

5. The pneumatic valve system of claim 1, wherein expansion of the pneumatic valve portion restricts substantially all fluid flow through the fluidic channel.

6. The pneumatic valve system of claim 1, wherein the pressure source comprises a pressured gas source.

7. The pneumatic valve system of claim 1, wherein first and second electrodes comprise carbon nanotubes.

8. The pneumatic valve system of claim 1, wherein the gate chamber portion has an area adjacent the first and second electrodes of about 8,000 $\mu m^2$ to about 1 $mm^2$.

9. The pneumatic valve system of claim 1, wherein the gate chamber portion has a thickness of about 1 to about 10 $\mu m$.

10. The pneumatic valve system of claim 1, wherein the pneumatic valve portion and the fluidic channel are spaced a distance of about 5 to about 200 $\mu m$.

11. The pneumatic valve system of claim 1, further comprising a first layer comprising the fluidic control line and a second layer comprising the fluidic channel.

12. The pneumatic valve system of claim 1, wherein the pressure-balancing chamber is in fluid communication with the gate chamber portion by a channel that extends from the gate chamber portion, around the first electrode, and to the pressure-balancing chamber.

13. A method of using a pneumatic valve system, the method comprising:
applying a pressure to a fluid in a fluidic control line having a gate chamber portion;
applying an electrical potential difference between a first electrode and a second electrode thereby moving the first and second electrodes toward one another to compress the gate chamber portion, the gate chamber being in a normally-open condition;
balancing a force on the first electrode using a pressure-balancing cavity in fluid communication with the fluidic control line and disposed such that the first electrode is located between the pressure-balancing cavity and the gate chamber portion;
increasing the pressure in a pneumatic valve portion of the fluidic control line thereby expanding the pneumatic valve portion; and
compressing a fluidic channel with the expanding pneumatic valve portion where the fluidic channel is fluidicly isolated from the fluidic control line.

* * * * *